(12) United States Patent
Reck et al.

(10) Patent No.: US 12,428,100 B2
(45) Date of Patent: Sep. 30, 2025

(54) DEVICE FOR CONTROLLING A MOTOR OF AN ELECTRIC BICYCLE

(71) Applicant: Robert Bosch GmbH, Stuttgart (DE)

(72) Inventors: Joseph Reck, Filderstadt (DE); Daniel Baumgaertner, Tuebingen (DE); Matthias Weinmann, Balingen (DE); Merlin Martin Manewald, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 506 days.

(21) Appl. No.: 18/058,949

(22) Filed: Nov. 28, 2022

(65) Prior Publication Data

US 2023/0166810 A1 Jun. 1, 2023

(30) Foreign Application Priority Data

Nov. 30, 2021 (DE) ...................... 10 2021 213 537.4

(51) Int. Cl.
*B62M 6/50* (2010.01)
*B62J 45/415* (2020.01)
*B62M 6/55* (2010.01)

(52) U.S. Cl.
CPC ..................... *B62M 6/50* (2013.01)

(58) Field of Classification Search
CPC . B62M 6/50; B62M 6/55; B62J 45/411; B62J 45/415
See application file for complete search history.

(56) References Cited

U.S. PATENT DOCUMENTS

2020/0216141 A1  7/2020  Murthy

FOREIGN PATENT DOCUMENTS

| DE | 102011083072 A1 | 3/2013 | |
|----|-----------------|--------|--|
| DE | 102013216723 A1 | 2/2015 | |
| DE | 102018203397 B3 | 9/2019 | |
| DE | 102019205858 A1 | 10/2020 | |
| WO | WO-2015073791 A1 * | 5/2015 | .............. B62M 6/45 |

* cited by examiner

*Primary Examiner* — Tinh Dang
(74) *Attorney, Agent, or Firm* — NORTON ROSE FULBRIGHT US LLP

(57) ABSTRACT

A device for controlling a motor of an electric bicycle. The device includes a control electronics system that is set up to control a torque of the motor in a normal operating mode based on an acquired driver torque; to detect during normal operation whether, at the current motor torque, no rotation of the motor is taking place even though a driver torque is being exerted, and to control the motor to continue to provide the motor torque in a blocking operating mode if it has been detected that at the present motor torque no rotation of the motor is taking place even though a driver torque is being exerted.

13 Claims, 2 Drawing Sheets

DEVICE FOR CONTROLLING A MOTOR OF AN ELECTRIC BICYCLE

CROSS REFERENCE

The present application claims the benefit under 35 U.S.C. § 119 of German Patent Application No. DE 10 2021 213 537.4 filed on Nov. 30, 2021, which is expressly incorporated herein by reference in its entirety.

FIELD

The present invention relates to a device for controlling a motor of an electric bicycle.

BACKGROUND INFORMATION

Pedelecs provide motorized support as a function of a bicycle torque. This is acquired by a torque sensor. In order to ensure safe operation, the motor support is enabled only when the motor is actually rotating. If the motor rotational speed falls below a threshold for a certain period of time, the motor support is disabled until a startup process is again recognized. In various situations, this can have the result that the motor support is taken away even if the driver does not desire this. This can happen in particular in cases in which the bicycle, and thus the motor, are not moving. For example, the driver may be driving up a steep slope off-road and may come to a standstill. The bicycle is balanced, and there is still enough pressure on the pedals. Nonetheless, the motor support shuts off. Here, the startup threshold of the bicycle torque continues to be exceeded, but the further conditions for returning to the state in which motor support is provided are not met. Thus, in particular there is no acceleration, no speed, and no driver behavior that would result in motor support. This will not be the case until the driver again sets the bicycle into motion under his own power.

SUMMARY

A device according to an example embodiment of the present invention for controlling a motor of an electric bicycle includes a control electronics system that is set up to control a torque of the motor during normal operation based on an acquired driver torque, to detect during normal operation whether, at the current motor torque, no rotation of the motor is taking place even though a driver torque is being exerted, and to control the motor to continue to provide the motor torque in a blocking operating mode if it has been detected that at the present motor torque no rotation of the motor is taking place even though a driver torque is being exerted.

The motor torque is a torque that is provided by the motor via a drivetrain of the bicycle to advance the bicycle. In normal operation, the motor torque is controlled based on the acquired driver torque. This means that typically a driver torque is acquired and an associated motor torque is calculated, the motor being controlled by the control electronics in such a way that these electronics provide the calculated motor torque. The driver torque is a torque provided by a driver when pedaling. The driver torque thus results from the force exerted on a pedal of the bicycle by a driver.

Normal operation is an operating state in which the bicycle is operated during forward movement when motor support is provided by the motor. Normal operation could thus also be designated driving operation of the bicycle.

During normal operation, the control electronics detects whether, at the existing torque, no rotation of the motor is taking place even though the driver torque is being exerted, and the driver torque is thus not equal to 0 Nm. For example, a rotational speed sensor acquires whether a rotation of the motor is taking place. An associated torque sensor can acquire whether a driver torque is being exerted. This information is usually known anyway, because it is preferably required for the controlling of the motor torque in normal operation. Thus, if a state arises in which a driver exerts a force on a pedal, i.e., a driver torque is being exerted, and this driver torque results in a motor torque but no rotation of the motor takes place, this has the result that the control electronics changes over from normal operation to blocking operation. The detection of whether, at the presently existing torque, no rotation of the motor is taking place even though a driver torque is being exerted can thus be regarded as a transition condition in response to which the control electronics changes over from normal operation to blocking operation.

In blocking operation, the motor is controlled by the control electronics in order to continue to provide the motor torque even when no rotation of the motor is taking place. Here the motor torque preferably continues to be calculated based on the driver torque, but optionally a reducing factor is also applied. Thus, the motor continues to provide a support force even if this force does not result in an advance of the bicycle. In this way, the situation can be prevented in which motor support is shut off even though the driver of the bicycle still desires it. Thus, a state in which a driver torque is being exerted but no rotation of the motor is taking place indicates that the driver wishes to soon start up again, or wishes to deliberately hold the drivetrain of the bicycle in a pre-tensioned state. If for example the bicycle is on a slope and is being balanced by the driver, a force will continue to be exerted on the pedals in order to prevent the bicycle from rolling backwards. If in this state the motor torque were to be shut off, this support force would have to be immediately taken over by the driver. This could result in an undesired rolling backwards of the bicycle on the slope, and could also have the result that the driver is not able to travel further up the slope, because the driver will not be able to apply the force required to set the bicycle into motion again. In this way, the driver is supported in more situations without disregarding safety-relevant aspects. Sudden collapse of the motor support is prevented. Similar pre-tensioned situations may occur for example at traffic lights, if the bicycle is being balanced while the brake is applied in order to enable a rapid restart of motion.

Preferred developments of the present invention are disclosed herein.

Preferably, the control electronics is set up to reduce the motor torque during blocking operation over a temporal curve. Thus, the motor support, i.e., the provided motor torque, decreases over an applicable time, for example from 100% to 0%. This preferably takes place by applying a time-dependent reducing factor to a motor torque ascertained based on the driver torque. All temporal changes of the motor torque are preferably carried out continuously, so that no jumps in torque are detectable by the driver. This protects the components, in that while the motor is not moving the full motor torque can be outputted only for a limited time. This limitation can be made longer, or the motor support can be increased again when it is expected that the motor will soon be set back into rotation. This may be the case for example when there is a dynamic characteristic in the driver torque. This applies in particular to processes of balancing and restarting of motion.

According to an example embodiment of the present invention, further preferably, the control electronics is set up to select a duration of the temporal curve as a function of a position acquired by a position sensor and/or by an inclination sensor, in particular an inertial sensor. Here the duration of the temporal curve defines a time interval over which the blocking operation is maintained before leaving this operating mode, in particular in order to shut off the motor torque. Blocking operating mode is discontinued in particular when the provided motor torque has fallen to 0 Nm as a result of the reducing factor. In this way, the duration of blocking operation can be adapted for example by adjusting the temporal curve of the reducing factor. Based on the position acquired by the position sensor, it is for example recognized what terrain the bicycle is situated in. In terrain having inclines, for example in a mountainous region, a hilly area, or a bicycle park, more support or longer support is provided by the motor torque by selecting the duration of the temporal curve to be greater than in specified other positions. It can also be recognized whether the bicycle is in a hilly terrain via the acquired inclination. Here as well, it is advantageous if the temporal curve is chosen as a function of the inclination in such a way that, in the case of larger inclines, a larger duration is chosen for the temporal curve. The duration of the temporal curve defines in particular the time within which the motor torque in blocking operation is reduced to a target value, in particular to 0%. In other words, given a shorter duration, a reduction of the motor torque in blocking operation takes place that is faster than when a comparatively longer duration is selected.

According to an example embodiment of the present invention, preferably, the control electronics is set up to shut off the motor torque during blocking operation when a predefined duration since the beginning of blocking operation has elapsed. Thus, for example a maximum value can be defined via which the motor torque can be provided when the motor is blocking. In this way, for example overheating of the motor can be prevented.

According to an example embodiment of the present invention, it is also advantageous if the control electronics is set up to detect, during blocking operation, a first operating state that permits the inference that no further movement of the bicycle is desired by a driver of the bicycle, and to shut off the motor torque during blocking operation in response to the detection of the first operating state. In this way the motor can be protected, because the support is not provided unnecessarily. Preferably, through an evaluation of sensor signals from sensors situated on the bicycle, it is detected whether by a driver of the bicycle desires further movement of the bicycle, in particular specific temporal curves of the sensor signals being evaluated in such a way that they indicate that a driver of the bicycle does not desire further movement of the bicycle.

According to an example embodiment of the present invention, preferably, the first operating state is defined by a curve of a driver torque. This means that, based on a particular curve of the driver torque, an intention of the driver can be inferred, in this case that the driver of the bicycle does not desire further movement of the bicycle. Thus, the behavior of the driver changes in a particular way when the driver does not desire further advance of the bicycle. In particular, it can be inferred that no further movement of the bicycle is desired by the driver when the driver torque is below a predefined first threshold value over a defined period of time, a derivative of the driver torque over its temporal curve does not have a gradient above a predefined second threshold value, a variance of the driver torque over its temporal curve is smaller than a predefined third threshold value, and/or an integral over a temporal curve of the driver torque within a detection interval is smaller than a fourth threshold value. For all these options, the threshold value, i.e. the first through fourth threshold value, is not necessarily chosen to be zero. It is advantageous if the driver torque continues to be monitored during blocking operation, the motor torque not being shut off immediately when there is briefly no driver torque. A balancing of the bicycle for example has the result that the driver torque has a high dynamic characteristic, during which the driver torque may also be zero for a brief time. Through corresponding setting of the threshold value or threshold values it is possible for example to define situations in which, for example, the driver is balancing the bicycle, i.e. desires further movement of the bicycle.

According to an example embodiment of the present invention, the control electronics is preferably set up to acquire a braking behavior of the driver via a brake sensor system, such that during blocking operation the first operating state is detected only when the brake sensor system detects that no brake lever is being actuated and/or a brake pressure of a brake of the bicycle is below a fifth threshold value. Blocking operation is an operating state in which, typically, a driver torque continues to be exerted, because blocking operation is preferably discontinued in order to shut off the motor torque when there is no longer a driver torque. If the brake sensor system detects that a brake is simultaneously being actuated by the driver, then from this it can be inferred that the driver wishes to soon start to move again, because otherwise the driver would no longer exert a torque in order to interrupt the trip, or would not actuate the brake in order to continue travel. It is thus ensured that the control electronics remains in blocking operation as long as further travel of the bicycle is to be expected, or until a higher-order termination condition results in shutting off the motor torque.

According to an example embodiment of the present invention, it is also advantageous if the control electronics is set up to detect a second operating state that permits the inference that the bicycle has been brought into a position that does not permit regular operation of the bicycle, and to shut off the motor torque in response to the detection of the second operating state. A position in which regular operation of the bicycle is not possible obtained for example if the bicycle is lying on the ground, tips over, or flips over. The second operating state can be detected in several ways. For example, based on camera images, inertial sensors, and/or distance sensors, it can be inferred that the bicycle has been brought into a position that does not permit regular operation of the bicycle. Here the position is to be understood as an orientation of the bicycle relative to its environment.

According to an example embodiment of the present invention, here it is particularly advantageous if the second operating state is defined by a curve of an inclination or acceleration acquired by an inertial sensor, the second operating state obtaining in particular when a pitch angle or roll angle of the bicycle is greater than a sixth threshold value, and/or when a curve acquired by the inertial sensor of a pitch angle or roll angle of the bicycle permits the inference that the bicycle has tipped over. Here the use of inertial sensors is particularly advantageous because these immediately provide the position of the bicycle as a sensor signal. The observation of an acquired curve of a pitch angle or roll angle of the bicycle enables a particularly fast detection of falls that could result in tipping over of the bicycle.

In addition, according to an example embodiment of the present invention, it is advantageous if the control electronics is set up to acquire a rotational speed of at least one wheel of the bicycle via a wheel rotational speed sensor, and to prevent a shutting off of the motor torque during blocking operation and/or during normal operation when an acquired absolute wheel rotational speed is above a seventh threshold value. Here the motor torque is not shut off for particular transition conditions. Thus, the shutting off of the motor torque is prevented only for transition conditions having low priority, and continues to be carried out for other transition conditions having higher priority. In particular, the shutting off of the motor torque during blocking operation and/or during normal operation is suppressed when the acquired absolute wheel rotational speed permits the inference that the bicycle is rolling backwards. In this way, undesired rolling backwards of the bicycle on a hill can be prevented.

According to an example embodiment of the present invention, it is also advantageous if the control electronics is set up to prevent a shutting off of the motor torque during blocking operation and/or during normal operation when an acquired negative rotational speed of the motor is above an eighth threshold value. In this way as well, it can be ensured that uncontrolled rolling backwards of the bicycle on a hill is prevented.

In addition, according to an example embodiment of the present invention, it is advantageous if the control electronics is set up to receive via a communication interface, in particular a bike-to-X interface, an item of information about the movement of a vehicle traveling in front and/or about roadway infrastructure lying ahead, and to shut off the motor torque if the information about the movement of the vehicle traveling in front indicates that the vehicle traveling in front is standing still and/or if the roadway infrastructure lying ahead indicates a necessity of stopping, even if it has been detected that, at the present motor torque, no rotation of the motor is taking place even though a driver torque is being exerted. The control electronics thus does not change over to blocking operation if it is recognized that a vehicle traveling in front is standing still, or if there is some other reason why further travel is not possible. Here the communication interface is in particular a WLAN interface, a Bluetooth interface, or a mobile radiotelephone interface, or some other wireless communication interface. The corresponding item of information is typically provided by the vehicle traveling in front itself and is communicated to the control electronics via the communication interface.

In addition, according to example embodiment of the present invention, it is advantageous if the control electronics is set up to receive image information from a camera situated on the bicycle, and to carry out an image processing in order to recognize predefined traffic situations, and/or to receive a communication signal that indicates the presence of a predefined traffic situation, and, in response to a recognized predefined traffic situation, to modify a startup condition that has to be met for the motor torque to be controlled by the control electronics in normal operation, to modify a duration of a temporal curve via which the motor torque is reduced during blocking operation, and/or to shut off the motor torque during blocking operation or during normal operation. In this way, from the environment of the bicycle a multiplicity of circumstances can be recognized that have the consequence that a particular driving behavior by a driver is to be expected. In particular using modern AI algorithms, it is possible to recognize such traffic situations and to correspondingly adapt the behavior of the control electronics. A traffic situation here is for example the presence of a red traffic light. This can be recognized for example via the image processing or can be indicated by the traffic light via a communication signal. In this way a driving behavior of the bicycle is adapted to current traffic situations, and operation of the bicycle is made easier for the driver. The communication signal is preferably a signal received via a bike-to-X interface.

BRIEF DESCRIPTION OF THE DRAWINGS

In the following, exemplary embodiments of the present invention are described in detail with reference to the figures.

DETAILED DESCRIPTION OF EXAMPLE EMBODIMENTS

Figure 1:
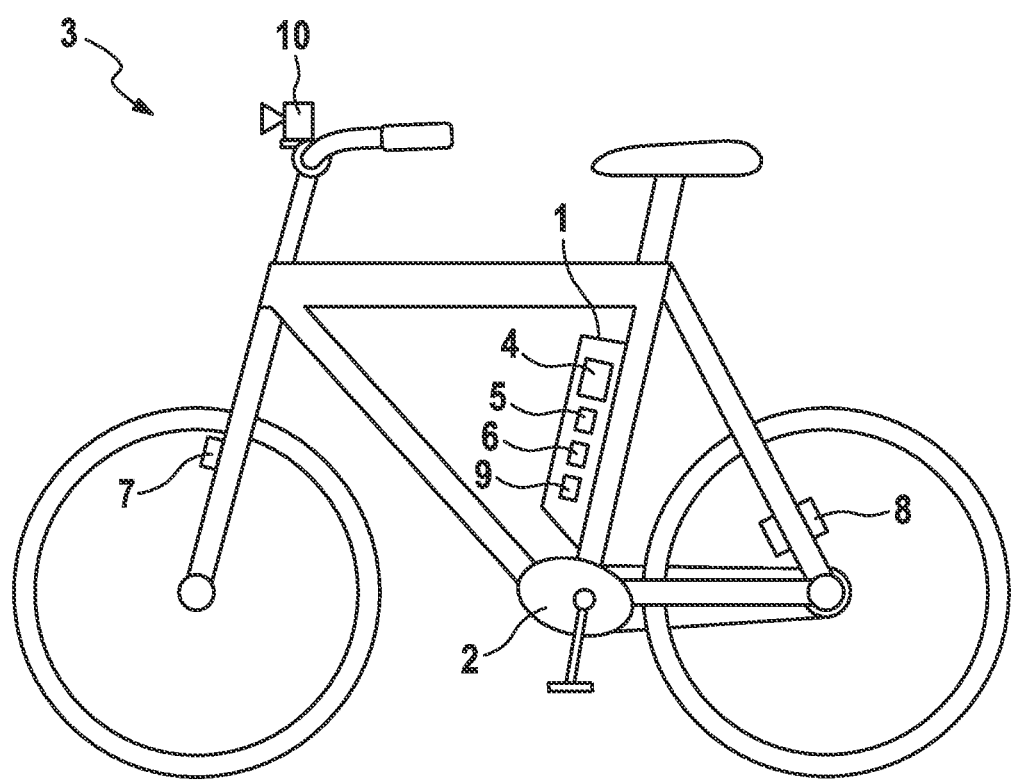
FIG. 1 shows a representation of a bicycle having a device according to an example embodiment of the present invention.

FIG. 1 shows a schematic representation of an electric bicycle 3 that has a device 1 according to the present invention for controlling a motor 2 of the electric bicycle 3. An associated method for controlling motor 2 of electric bicycle 3 is carried out by control electronics 4.

Figure 2:
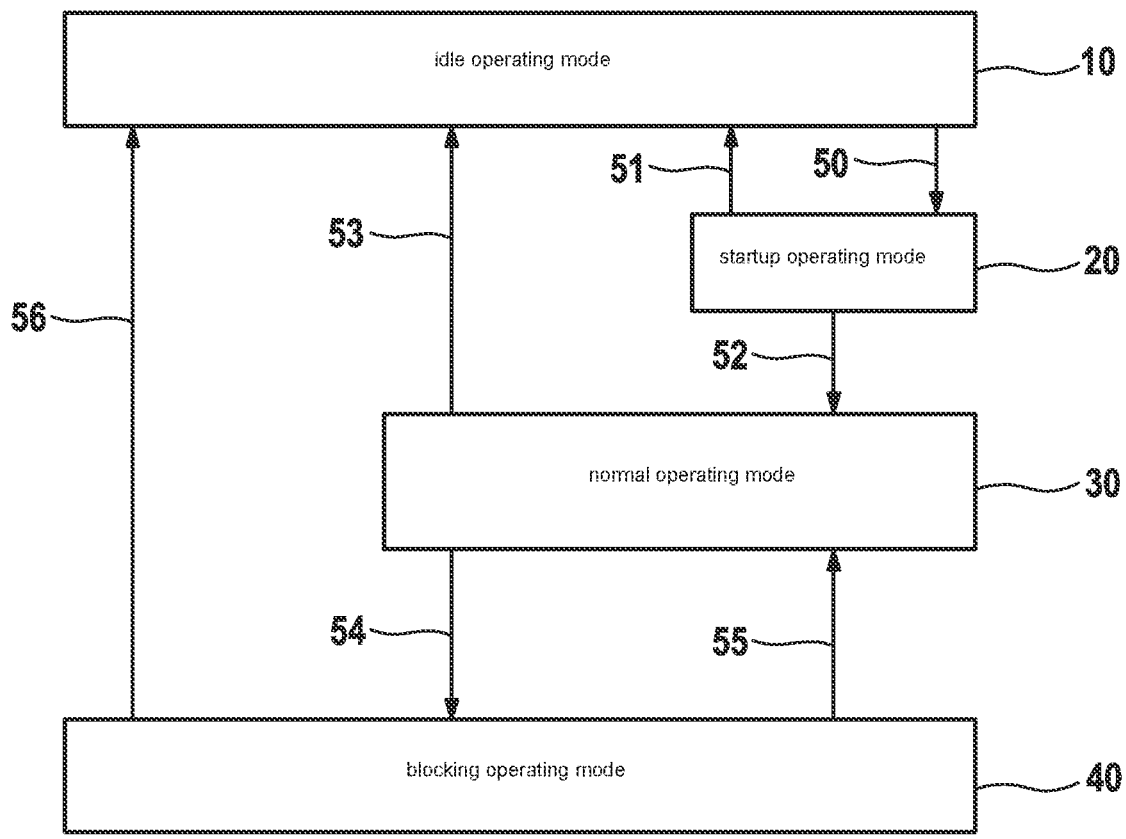
FIG. 2 shows a flow diagram of a method for operating a control electronics of the device, according to an example embodiment of the present invention.

A flow diagram for the method carried out by control electronics 4 is shown in FIG. 2. Through control electronics 4, motor 2 is operated in various operating modes, control electronics 4 being capable of providing an idle operating mode 10, a startup operating mode 20, a normal operating mode 30, and a blocking operating mode 40.

In idle operating mode 10, no motor support takes place. Idle operating mode 10 is carried out when bicycle 3 is standing still, and is an initial state of the system. In idle operation 10, the motor support is disabled.

Startup operating mode 20 is also referred to as poke. In startup operation, a small torque is applied to a drivetrain, i.e., a small motor torque is controlled, in order to check whether motor 2 can rotate freely or is blocked. If motor 2 can rotate freely, then a changeover to normal operating mode 30 takes place. If motor 2 does not rotate, then a change back to idle operation 10 takes place.

In normal operating mode 30, the full motor support by motor 2 is enabled. The motor torque is controlled based on an acquired driver torque. Normal operating mode 30 is the normal state during supported travel.

A transition between operating states 10, 20, 30, 40 takes place according to associated transition conditions 50 through 56.

If a first transition condition 50 is met, then control electronics 4 goes from idle operating mode 10 into startup operating mode 20. First transition condition 50 is a startup condition. The startup condition is met for example when the driver of bicycle 3 exerts a driver torque.

If a second transition condition 51 is met, then control electronics 4 goes from startup operating mode 20 into idle operating mode 10. Second transition condition 51 is met for example when motor 2 is not rotating.

If during startup operating mode 20 a third transition condition 52 is met, then control electronics 4 goes from startup operating mode 20 into normal operating mode 30.

The third transition condition is for example a recognition that motor 2 can rotate freely.

In normal operation 30, the motor torque of motor 2 is controlled by the control electronics based on the acquired driver torque. This means that a torque exerted on the pedals of bicycle 3 by a driver of bicycle 3 is acquired, and, based on the acquired driver torque, motor 2 is controlled to provide a corresponding motor torque.

If, during normal operation 30, it is detected that at the present motor torque no rotation of motor 2 is taking place even though the driver torque is being exerted, then a fifth transition condition 54 is not met and control electronics 4 changes from normal operating mode 30 to blocking operating mode 40. In blocking operating mode 40, motor 2 continues to be controlled so as to provide the motor torque corresponding to the driver torque. In blocking operation 40, this takes place even when it has been detected that no rotation of motor 2 is taking place. Blocking operating mode 40 thus differs from normal operating mode 30, inter alia, in that in normal operation a rotation of motor 2 takes place, and in blocking operation 40 no rotation of motor 2 takes place. Thus, when there is a blocking of motor 2 control electronics 4 does not immediately change back to idle operation 10, but at first continues to provide the motor torque.

In blocking operating mode 40, motor 2 cannot rotate, or at least can rotate only to a limited extent. In order to protect the components of the drive of electric bicycle 3, when motor 2 is at a standstill the full motor torque should be outputted only for a limited time. Therefore, in blocking operation 40 the motor torque is reduced over a temporal curve. Thus, the motor support, i.e. the provided motor torque, for example decreases from 100% to 0% over an applicable time to. Here, the applicable time to is a duration of the temporal curve over which the motor torque is to be reduced. The temporal curve from 0 to 100% is chosen to be continuous and preferably also as smooth as possible, so that there is no sudden collapse of the motor torque. If the motor support falls to 0%, then a seventh transition condition 56 is met and control electronics 4 changes over to idle operation 10. Thus, the motor torque is shut off by control electronics 4 when the predefined duration has elapsed during which the motor torque is reduced over the temporal curve.

When control electronics 4 is in normal operating mode 30, it goes back to idle operating mode 10 when a fourth transition condition 53 is met. Fourth transition condition 53 includes in particular critical driving situations that make an immediate shutting off of motor 2 necessary.

When control electronics 4 is in blocking operating mode 40, it goes back to idle operating mode 10 when the seventh transition condition 56 is met. This seventh transition condition 56 indicates in particular that it is no longer to be expected that the driver will wish to soon set bicycle 3 into motion. In order to achieve this, control electronics 4 is set up to detect, during blocking operation 40, a first operating state that permits the inference that no further movement of bicycle 3 is desired by the driver of bicycle 3. The presence of the first operating state can thus be regarded as the seventh transition condition 56. In response to the recognition of the first operating state during blocking operation 40, the motor torque is shut off and control electronics 4 thus goes back to idle operating mode 10. A desire on the part of the driver that no further movement of the bicycle is desired can be detected in various ways. In particular, an analysis of a curve of the driver torque is suitable for this purpose. Here, for example it is analyzed whether the driver torque is below a predefined first threshold value for a defined period of time. Thus, if the driver exerts only a very small driver torque, this may indicate that no further movement of the bicycle is desired. Such situations occur for example when the driver lets his foot rest on the pedal and thus produces a small driver torque that is however below the first threshold value. An absolute value of the signal is thus considered. If this absolute value is below a threshold value for an applicable time, then control electronics 4 changes from blocking operating mode 40 to idle operating mode 10.

Alternatively or in addition, the first operating state is defined in that a derivative of the driver torque, over its temporal curve, does not have a gradient above a predefined second threshold value. Thus, if an existing driver torque does not show any strong changes, it can be inferred that a current state of the bicycle is adequate and no further movement is desired. In contrast, a driver torque typically has high gradients when the driver is balancing the bicycle. Thus, a derivative of the signal is considered. If no gradient above a threshold value is seen for an applicable time, then control electronics 4 changes from blocking operating mode 40 to idle operating mode 10.

Alternatively or in addition, the first operating state is met when a variance of the driver torque, over its temporal curve, is below a predefined third threshold value. Here, the variance is a variability of the driver torque. It is also true that a balancing of the bicycle is typically taking place when a driver torque has a high variance.

Alternatively or in addition, the first operating state is met when an integral, over a temporal curve of the driver torque, is smaller than a fourth threshold value within a detection interval. The detection interval here is the time interval over which integration is done. The integral can be described as $\int_{t-t_1}^{t} M_{driver}(t)dt$, where $M_{driver}$ is the driver torque. If the integral is smaller than an applicable threshold value (with $t_1$ as the applicable time), then control electronics 4 changes from blocking operation 40 to idle operation 10.

In addition, it is advantageous if a factor by which the motor torque is reduced over the temporal curve during blocking operation 40 is increased when the driver torque shows a high dynamic characteristic over its temporal curve, which is the case for example when there is a high gradient or a high variance. The factor (0-100%) that reduces the motor torque is thus increased. That is, a larger motor torque is permitted when there is a higher dynamic characteristic. In this way, the duration of the temporal curve is made longer, because the motor torque decreases more slowly. In this way, it can be ensured that the motor support in blocking operation 40 is ensured over an adequate time.

Control unit 4 is in addition set up to acquire a braking action of the driver via a brake sensor system 8, the first operating state being detected during blocking operation 40 only when the brake sensor system detects that no brake lever is being actuated and/or a brake pressure of a brake of bicycle 3 is below a fifth threshold value. In this way, with the first operating state conditions can be defined as seventh transition condition 56 that have to be met for control electronics 4 to change from blocking operation 40 to idle operation 10. In addition, conditions can be defined that delay or prevent this change from blocking operation 40 to idle operation 10, so that blocking operation 40 is maintained longer. Here it is also advantageous if a factor according to which the motor torque decreases is reduced. A parameter that is taken into account here is the braking behavior of the driver. If the driver actuates a brake of bicycle 3, which can be recognized by a sensor through an actuation of the brake lever or a detection of a brake pressure of brake 3, then it can be inferred that a drivetrain of bicycle 3 is being deliberately held in a pre-tensioned state by the driver, because the driver himself is at the same time exerting a driver torque, and at the same time the forward movement is being actively prevented by an actuation of the brake. In this state blocking operation 40 is to be maintained, so that the motor torque also continues to be provided. Thus, if the brake lever is actuated, or if a brake pressure of the brake of the bicycle is above the fifth threshold value, then control electronics 40 remains in blocking operating mode 40 even when the first operating state is present, and the seventh transition condition 56 is thus met. However, if no brake lever is actuated, or if the brake pressure of the brake of bicycle 3 falls below the fifth threshold value, then, when the first operating state obtains, a change takes place from blocking operation 40 to idle operation 10. If in blocking operation 40 motor 2 is not rotating but the brake is applied, then no critical situation can arise, because the driver is actively bringing the bicycle to a standstill, but presumably with the intention of starting up again soon. The drivetrain is thus deliberately being pre-tensioned by the driver, for example in order to make a quick start or during a balancing situation.

The control electronics is set up to detect a second operating state that permits the inference that bicycle 3 has been brought into a position that does not permit regular operation of the bicycle 3, and to shut off the motor torque in response to the detection of the second operating state. A position that does not permit regular operation of the bicycle is in particular when bicycle 3 is lying on the ground, or is tipping over or falling over. The position is thus a spatial position of bicycle 3.

The second operating state is preferably detected via a curve of an inclination or acceleration acquired by an inertial sensor 6. The second operating state is present in particular if a pitch or roll angle of bicycle 3, acquired by inertial sensor 6, is greater than a sixth threshold value, or a curve, acquired by inertial sensor 6, of a pitch or roll angle of bicycle 3 permits the inference that bicycle 3 has tipped over. For example, if the roll angle then increases past the sixth threshold value, it can be inferred that bicycle 3 is lying on the ground. It is therefore in a position that does not permit regular operation of the bicycle. If the pitch angle increases beyond a specified threshold value, here the sixth threshold value, then for example it can be inferred that bicycle 3 has flipped over and is thus in a position that does not permit regular operation. From a curve of the pitch or roll angle of the bicycle it can also be inferred whether the bicycle has been brought out of a typical operating position. Inertial sensor 6 is in particular an inclination sensor or an acceleration sensor. It is to be noted that a change in a pitch or roll angle of bicycle 3 can also be inferred from an acceleration along a particular axis.

In particular, the position of the bicycle in space can be ascertained via the combination of the rotational rates and acceleration sensors, for example using a Kalman filter. On the basis of angle signals from inertial sensor 6, a decision can be made for control electronics 4 to go into idle operation 10 if the pitch or roll angle is greater than a threshold value, and the bicycle is thus for example upside down. Alternatively or in addition, idle operating mode 10 can be introduced when the roll angle changes from an upright to a lying position with a particular speed, which is the case for example when bicycle 3 is tipping over, for example from a balancing situation. It is advantageous if control electronics 4 brings about the second operating state both in normal operation 30 and in blocking operation 40. This is advantageous because an introduction of idle operation 10, i.e. shutting off the motor support, is advantageous in every case when for example a fall is occurring.

If the device includes inertial sensor 6, then it is optionally possible, by combining angular information and acceleration values, also to recognize more complex driving situations, such as jumping and balancing on a rear wheel. In this case, it is also advantageous if a transition from blocking operation 40 to idle operation 10 does not take place, in order to continue to ensure motor support for this maneuver. It is thus advantageous if the first operating state is detected only when inertial sensor 6 detects that none of a plurality of predefined driving maneuvers are being carried out.

In addition, inertial sensor 6 can also acquire an incline, and the duration of the temporal curve over which the motor torque decreases in blocking operation 40 can be adapted. The duration to of the temporal curve is for example increased when bicycle 3 is in hilly terrain, such as a bike park, which can be recognized based on the presence of a large incline. However, it is to be noted that such recognition of situations in which bicycle 3 is in hilly terrain can also take more complex form. Thus, a hilly terrain can for example also be recognized as a function of a duration of a present incline, a change in incline, and a variation in the present speed. Alternatively or in addition, a position sensor 5 recognizes whether the bicycle is situated in hilly terrain. Here, other situations can also be recognized in which it is advantageous to maintain blocking operation 40 for a longer time, i.e. the temporal duration of the time period over which the motor torque is made longer.

Position sensor 5 is for example a GPS sensor. On the basis of the GPS information, possibly in combination with a height measurement (e.g. barometric pressure sensor) and associated map data, it can additionally be estimated if, and how quickly, the driver wishes to travel further. In this way, the time $t_0$ defined for the blocking state 40, i.e. the duration of the temporal curve over which the motor torque decreases, can be varied. When the time $t_0$ is greater, the motor support decreases more slowly.

In the following situations, the time $t_0$ is for example increased because a longer support is necessary and appropriate: the bicycle is in a generally hilly terrain/bike park, the bicycle is on a single trail, the bicycle is at an intersection, or the inclination value is greater than a specified threshold value.

In the following situations, the time within which the motor torque decreases is reduced:
the bicycle is on a normal street or bicycle path, there is a downward incline (no support necessary), or in street traffic with busy traffic (safety).

Control electronics 4 is in addition set up to acquire, with at least one wheel rotational speed sensor 7, a rotational speed of at least one wheel of bicycle 3, and to prevent a shutting off of the motor torque during blocking operation 40 and/or during normal operation 30 when an acquired absolute wheel rotational speed is above a sixth threshold value. Thus, the seventh transition condition 57 is recognized for example only when both wheel rotational speeds of the two wheels of bicycle 3 are, in their absolute value, below a threshold value. Here, the internal speed used can vary in its accuracy, depending on the speed sensor used. The threshold values are to be adapted to the sensor used. If the bicycle is rolling backwards, then in blocking operation 40 the motor support is shut off only when bicycle 3 is moving only slowly. In this way, it is for example prevented that, when the bicycle is rolling backwards, for example when a driver wants to exit a hill situation backwards, the motor torque suddenly stops and an uncontrollable backward movement occurs. A change to idle operation 10 does not take place unless bicycle 3 is moving only slowly, for example through actuation of the brake.

Control electronics 4 is also set up to prevent a shutting off of the motor torque during blocking operation 40 and/or during normal operation 30 when an acquired negative rotational speed of the motor is above an eighth threshold value. The control electronics thus preferably changes from blocking operation 40 to idle operation 10 when the present motor rotational speed also does not indicate that bicycle 3 is rolling backwards. Positive motor rotational speeds result in a change to normal operating mode 30.

When, in blocking operating mode 40, the motor can again rotate freely, or the motor rotational speed is above a positive threshold value, a change back to normal operating mode 30 takes place.

In addition, control electronics 4 is set up to receive, via a communication interface 9, an item of information about the movement of a vehicle traveling in front, and to shut off the motor torque if the information about the movement of a vehicle traveling in front indicates a standstill of the vehicle traveling in front, even if it has been detected that, at the present motor torque, no rotation of motor 2 is taking place even though a driver torque is being exerted. Thus, when the vehicle traveling in front is at a standstill control electronics 4 for example does not change, according to fifth transition conditions 54, from normal operating mode 30 to blocking operating mode 40. This is advantageous because it can be assumed that a roadway is blocked, and thus that the driver of bicycle 3 does not wish to start to move again soon. Thus, it is not necessary to continue to provide the motor torque in blocking operating mode 40. Rather, a change directly to idle operating mode 10 can take place. Communication interface 9 is often provided in the context of connectivity options (bike-to-bike or bike-to-X communication), which for example enables communication between a plurality of bicycles, for example during group bicycle tours. Thus, in the context of a group bicycle tour, bicycle 3 is for example connected wirelessly to other bicycles, for example via WLAN, Bluetooth, mobile radio-telephone, or any other type of wireless communication. If these bicycles are riding in a line, then it is probable that they will follow the behavior of the leading bicycles. If the leading bicycle has been standing for a period of time, then the home vehicle may come to a standstill, which preferably results in an activation of idle operation 10. The vehicle traveling in front is thus preferably a vehicle that has been linked to control electronics 4 by a user.

In addition, control electronics 4 is set up to receive image information from a camera 10 situated on bicycle 3, and to carry out image processing in order to recognize predefined traffic situations. In response to a recognition of a predefined traffic situation, for example the startup condition, i.e. second transition condition 51, which has to be met for the motor torque to be controlled by control electronics 4 in normal operation 30, is modified after startup operation 20 has been carried out. For example, a startup condition is made more difficult if a red traffic light is recognized as the traffic situation. A duration of the temporal curve over which the motor torque is reduced during blocking operation 40 can also be modified based on the recognized predefined traffic situation. For example, the motor torque is reduced more quickly, i.e. the duration is shortened, when there is a red traffic light.

Alternatively or in addition, the traffic situation is recognized via a bike-to-X communication. Thus, a traffic light for example communicates its state of being red to control electronics 4 via a radio interface. The response of control electronics 4 is the same as when the red light is recognized via camera 10.

A recognition of a predefined traffic situation can optionally also have the result that the motor torque is directly shut off during blocking operation 40 or during normal operation 30. This could also take place for example when a red traffic light is recognized. In contrast, the startup condition could be made easier if a green light is recognized, and the motor support in blocking operation 40 is reduced more slowly when there is a green light. Alternatively or in addition, here as well the traffic situation is recognized via bike-to-X communication, for example when a traffic light communicates its red state to control electronics 4 via a radio interface.

Further examples of situations that can be recognized via the image information include obstacles in the roadway, the recognition of leading vehicles, the brightness of the environment (alternatively also capable of being acquired directly via a light sensor).

When an obstacle in the roadway is recognized or made known through communication, for example a railway crossing gate, parking garage gate, drawbridge, (garage) door, tunnel, border crossing, the startup condition can be made more difficult, the duration for the reduction of the motor torque in blocking operation 40 can be reduced, and/or after a transition from normal operation 30 to blocking operation 40 directly to idle operation 10 can take place.

When leading vehicles are recognized, the startup condition can be made easier and/or the duration for the reduction of the motor torque in blocking operation 40 can be made longer if the leading vehicle is moving forward and its brake lights go off. The startup condition can also be made more difficult, the duration for the reduction of the motor torque in blocking operation 40 can be reduced, and/or after a transition from normal operation 30 to blocking operation 40 directly to idle operation 10 can take place when the leading vehicle stops, is standing still, or its brake lights are recognized.

When there is a recognition of the brightness (also capable of being acquired directly via a light sensor), the startup condition can be made more difficult, the duration for the reduction of the motor torque in blocking operation 40 can be reduced, and/or after a transition from normal operation 30 to blocking operation 40 directly to idle operation 10 can take place if the brightness of the acquired environment is dark. Correspondingly, the startup condition can be made easier and/or the duration for the reduction of the motor torque in blocking operation 40 can be made longer if the acquired environment is comparatively bright. A combination with GPS data and clock time for a plausibilization is also possible. Outdoor brightness varies depending on the clock time and location. For example, a trip at night can be distinguished from an unlighted tunnel.

Similar to camera 10 situated on bicycle 3, in traffic situations recognition can also take place using distance radar or a similar environmental sensor system. In this way, in particular obstacles in the roadway or movements of leading vehicles can be detected. Complex driving situations can be recognized in particular through a combination of the information from various sensors.

The transition conditions described above can be applied independently of one another and can be combined with one another in any manner desired.

In addition to the above disclosure, reference is explicitly made to the disclosure of FIGS. 1 and 2.

What is claimed is:

1. A device for controlling a motor of an electric bicycle, the device comprising:
a control electronics unit configured to:
control a motor torque of the motor in a normal operating mode based on an acquired driver torque;
detect, during normal operation, whether at the present motor torque no rotation of the motor is taking place even though a driver torque is being exerted; and
control the motor to continue to provide the motor torque in a blocking operating mode when it has been detected that at the present motor torque no rotation of the motor is taking place even though a driver torque is being exerted.

2. The device as recited in claim 1, wherein the control electronics is further configured to reduce the motor torque during blocking operation over a temporal curve.

3. The device as recited in claim 2, wherein the control electronics being set up to select a duration of the temporal curve as a function of a position acquired by a position sensor and/or of an inclination acquired by an inclination sensor.

4. The device as recited in claim 1, the control electronics further being configured to shut off the motor torque during blocking operation when a predefined duration since a beginning of blocking operation has elapsed.

5. The device as recited in claim 1, wherein the control electronics is configured to:
detect during blocking operation a first operating state that permits the inference that no further movement of the bicycle is desired by a driver of the bicycle, and
shut off the motor torque during blocking operation in response to the detection of the first operating state.

6. The device as recited in claim 5, wherein the first operating state is defined by a curve of a driver torque, the first operating state being present when:
the driver torque is below a predefined first threshold value for a defined period of time, and/or
a derivative of the driver torque does not have, over its temporal curve, a gradient above a predefined second threshold value, and/or
a variance of the driver torque is less, over its temporal curve, than a predefined third threshold value, and/or
an integral of the driver torque over a temporal curve of the driver torque within a detection interval is smaller than a fourth threshold value.

7. The device as recited in claim 6, wherein the control electronics in addition being configured to acquire a braking behavior of the driver via a brake sensor system, the first operating state being detected during blocking operation only when the brake sensor system detects that:
no brake lever is being actuated, and/or
a brake pressure of a brake of the bicycle is below a fifth threshold value.

8. The device as recited in claim 1, wherein the control electronics is further configured to:
detect a second operating state that permits an inference that the bicycle has been brought into a position that does not permit a regular operation of the bicycle, and
shut off the motor torque in response to the detection of the second operating state.

9. The device as recited in claim 8, wherein the second operating state being defined by a curve of a gradient or acceleration acquired by an inertial sensor, the third operating state being present when:
a pitch or roll angle of the bicycle acquired by the inertial sensor is greater than a sixth threshold value, and/or
a curve of a pitch or roll angle of the bicycle acquired by the inertial sensor permits the inference that the bicycle is tipping over.

10. The device as recited in claim 1, wherein the control electronics is further configured to acquire a rotational speed of at least one wheel of the bicycle via at least one wheel rotational speed sensor, and prevent a shutting off of the motor torque during blocking operation and/or during normal operation when an acquired absolute wheel rotational speed is above a seventh threshold value.

11. The device as recited in claim 1, wherein the control electronics is further configured to prevent a shutting off of the motor torque during blocking operation and/or during normal operation when an acquired negative rotational speed of the motor is above an eighth threshold value.

12. The device as recited in claim 1, wherein the control electronics is further configured to:
receive, via a communication interface, an item of information about a movement of a vehicle traveling in front and/or a roadway infrastructure lying ahead, the communication interface being a bike-to-X interface, and
shut off the motor torque when the information about the movement of the vehicle traveling in front indicates that the vehicle traveling in front is standing still and/or when the roadway infrastructure lying ahead indicates a necessity of stopping, even if it has been detected that at the present motor torque no rotation of the motor is taking place even though a driver torque is being exerted.

13. The device as recited in claim 1, wherein the control electronics is further configured to:
receive image information from a camera situated on the bicycle and to carry out an image processing in order to recognize predefined traffic situations, and/or receive a communication signal that indicates the presence of a predefined traffic situation; and
in response to a recognized predefined traffic situation:
modify a startup condition that has to be met for the motor torque to be controlled by the control electronics in the normal operating mode, and/or
modify a duration of a temporal curve over which the motor torque is reduced during the blocking operating mode, and/or
shut off the motor torque during the blocking operating mode or during the normal operating mode.

* * * * *